United States Patent
Srivastava et al.

(10) Patent No.: US 11,722,879 B2
(45) Date of Patent: *Aug. 8, 2023

(54) INTERNET ACCESS INDICATION IN PRIVATE LTE NETWORKS AND NEUTRAL HOST NETWORKS

(71) Applicant: Cisco Technology, Inc., San Jose, CA (US)

(72) Inventors: Vimal Srivastava, Bangalore (IN); Indermeet Singh Gandhi, Bangalore (IN); Sudhir Kumar Jain, Fremont, CA (US); Srinath Gundavelli, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 17/192,293

(22) Filed: Mar. 4, 2021

(65) Prior Publication Data

US 2021/0195400 A1 Jun. 24, 2021

Related U.S. Application Data

(63) Continuation of application No. 16/540,397, filed on Aug. 14, 2019, now Pat. No. 10,986,486.

(51) Int. Cl.
| | |
|---|---|
| *H04W 8/08* | (2009.01) |
| *H04W 48/00* | (2009.01) |
| *H04W 8/26* | (2009.01) |
| *H04W 60/00* | (2009.01) |

(52) U.S. Cl.
CPC .............. *H04W 8/08* (2013.01); *H04W 8/26* (2013.01); *H04W 48/17* (2013.01); *H04W 60/00* (2013.01)

(58) Field of Classification Search
CPC ......... H04W 8/08; H04W 8/26; H04W 48/17; H04W 60/00; H04W 48/12; H04W 8/06
USPC .......................................................... 370/329
See application file for complete search history.

(56) References Cited

U.S. PATENT DOCUMENTS

| | | | |
|---|---|---|---|
| 9,860,817 B2 | 1/2018 | Wang et al. | |
| 10,285,114 B2 | 5/2019 | Griot et al. | |
| 10,299,299 B2 | 5/2019 | Vandikas et al. | |
| 2016/0192411 A1* | 6/2016 | Mori | H04W 74/002 370/329 |
| 2017/0318452 A1 | 11/2017 | Hahn et al. | |
| 2017/0325149 A1* | 11/2017 | Nagasaka | H04W 48/16 |
| 2017/0374695 A1* | 12/2017 | Lau | H04L 65/1069 |
| 2018/0146408 A1 | 5/2018 | Meylan et al. | |
| 2018/0220346 A1 | 8/2018 | Won et al. | |
| 2018/0324740 A1 | 11/2018 | Edge et al. | |
| 2019/0223076 A1 | 7/2019 | Albasheir et al. | |
| 2019/0313225 A1* | 10/2019 | Gitlin | H04W 4/70 |
| 2021/0051464 A1 | 2/2021 | Srivastava et al. | |

* cited by examiner

*Primary Examiner* — Mang Hang Yeung
(74) *Attorney, Agent, or Firm* — Edell, Shapiro & Finnan, LLC

(57) ABSTRACT

A Radio Access Network (RAN) element provides an internet indication to a User Equipment (UE) to enable the UE to quickly obtain internet access. The RAN element determines that the RAN element is connected to at least one gateway that provides public internet access, and broadcasts an internet indication. The RAN element determines that the UE has requested public internet access via the RAN element and provides the UE with public internet access.

20 Claims, 6 Drawing Sheets

INTERNET ACCESS INDICATION IN PRIVATE LTE NETWORKS AND NEUTRAL HOST NETWORKS

CROSS-REFERENCE TO RELATED APPLICATIONS

This application in a continuation of U.S. application Ser. No. 16/540,397, filed Aug. 14, 2019, the entire contents of which are incorporated herein by reference.

TECHNICAL FIELD

The present disclosure relates to private Long Term Evolution (LTE) networks in the Citizens Broadband Radio Service (CBRS) band.

BACKGROUND

The opening of the CBRS band allows private organizations to provide private LTE networks. Private LTE networks provide more reliable network access without the interference and congestion inherent in IEEE 802.11 (i.e., Wi-Fi) networks. Some organizations may leverage the lightly/semi-licensed bands of the CBRS spectrum to support various types of applications. Typically, to determine the limits of access provided by a network connection (e.g., a publicly available Wi-Fi network), and find an acceptable network with internet access, a user connects to each network and attempts to access the desired service.

DESCRIPTION OF EXAMPLE EMBODIMENTS

Overview

A method is provided to enable an eNB to provide an internet indication to a UE. The method includes determining that the eNB is connected to at least one gateway that provides public internet access, and broadcasting an internet indication in a predetermined SIB. The method also includes receiving an attach request from a UE. The attach request includes an attach type of internet enabled and a PDN type of internet enabled. The method further includes forwarding the attach request to an MME.

Example Embodiments

Presented herein are techniques for defining semantics in the attachment procedure for CBRS band networks for presenting indicators of services (e.g., internet access) to the user devices before the user device attaches to any particular network.

Currently, there are not semantics for the network elements of a private LTE network to indicate a service (e.g., internet access) is available to a mobile device. In the absence of such semantic, a mobile device may discover a free network and attach to it, only to find out that there is no internet access via the free network. The attach sequence may devolve into a trial and error method, which can frustrate the end user. Furthermore, this issue may be magnified in Neutral Host Network (NHN) environments, where multiple providers share network elements. The techniques presented herein provide for each cell broadcasting the support for internet service in the System Information Blocks, such as System Information Block 1 (SIB1).

Figure 1:
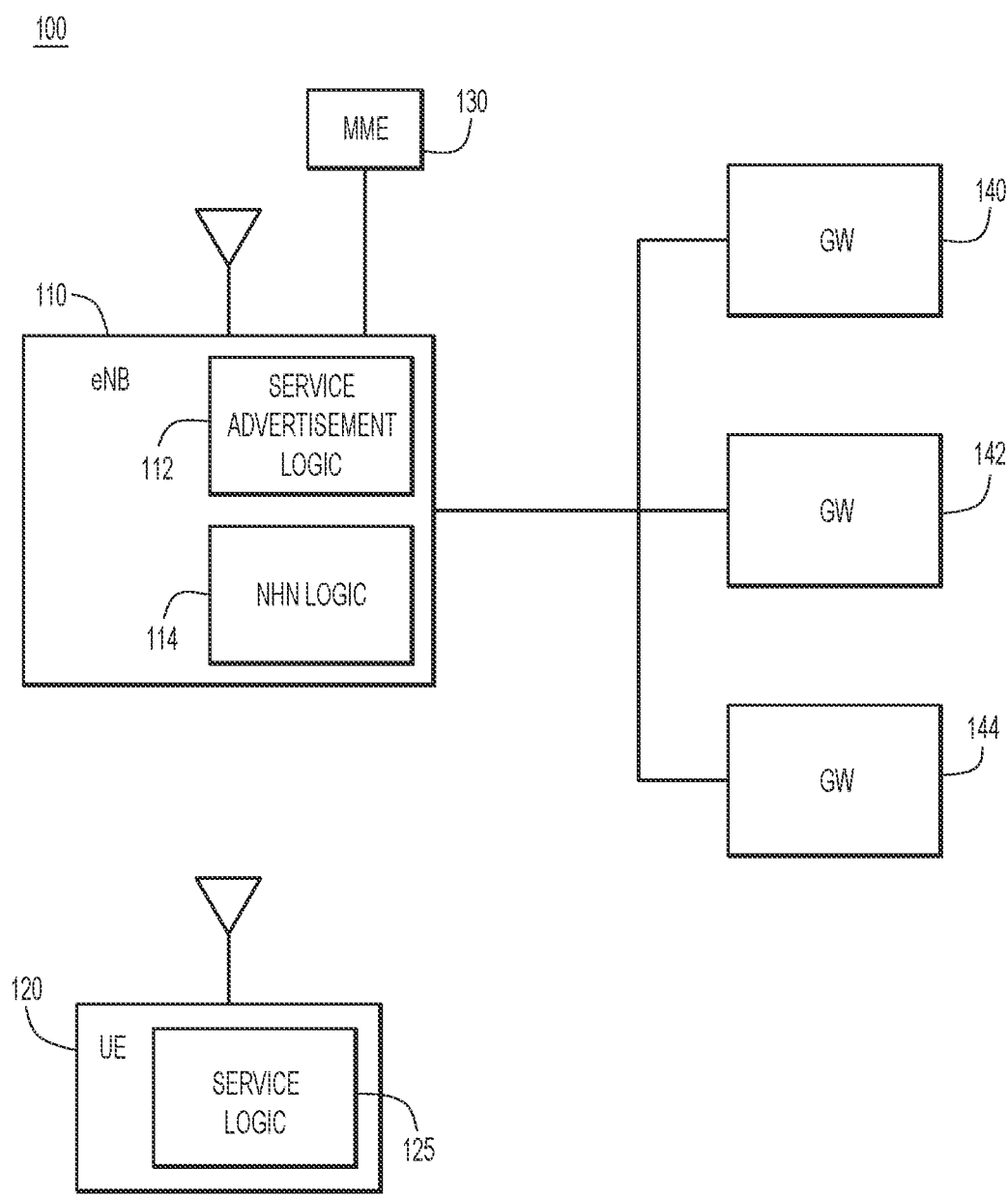
FIG. 1 is a simplified block diagram of a wireless communication system configured to provide user equipment with information on internet accessibility, according to an example embodiment.

Referring now to FIG. 1, a wireless communication system 100 is shown that is configured to enable an Evolved Node B (eNB) to broadcast internet accessibility within a standard LTE format. The eNB 110 includes service advertisement logic 112 that enables the eNB 110 to advertise internet service accessibility to mobile devices in the vicinity of the eNB 110. The eNB 110 also includes NHN logic 114 that enables the eNB 110 to act as an access point for multiple service providers (e.g., through multiple gateways).

The wireless communication system 100 also includes a mobile device 120, e.g., a User Equipment (UE), with service logic 125. The service logic 125 enables the UE 120 to obtain information from the eNB 110, select a service provider, and attach to the eNB 110 to obtain internet access through the selected service provider.

The wireless communication system 100 also includes a Mobility Management Entity (MME) 130 and gateway (GW) devices 140, 142, and 144. The MME 130 is configured to coordinate the data connections for the UE 120 as the UE 120 moves between different eNBs. The gateway devices 140, 142, and 144 are configured to provide access to Packet Data Network (PDN), which may include internet access. As used herein, each GW device 140, 142, and 144 is associated with a different service provider, enabling the eNB 110 to function in a NHN environment with multiple service providers sharing a network element, i.e., the eNB 110.

In one example, a single operator offers a private LTE cell through eNB 110 as a single provider. In other words, the Radio Access Network (RAN) and core network are both owned by a single operator. In this example, the UE 120 may be configured with a service profile with internet service enabled, and the eNB 110 broadcasts an internet indication enabled in the SIB1 block. While latching on to the network, the UE 120 checks the SIB1 block to determine if the internet indication is being broadcast. The UE 120 will attach to the network and configure the attach-type to be internet enabled and the PDN-request-type to be internet enabled.

On receiving the attach request with the attach-type and PDN-request-type indicating internet enabled, the MME 130 may find the default Access Point Name (APN) locally configured. The MME 130 allows the UE 120 to attach to the network and facilitate PDN connectivity. Optionally, if the UE 120 has provided an International Mobile Subscriber Identifier (IMSI) with the attach request, the MME 130 may determine the Public Land Mobile Network (PLMN) for the IMSI and determine the default APN for the PLMN. If the UE 120 does not provide an IMSI, then a Diffie-Hellman exchange may be used for security protection.

Figure 2:
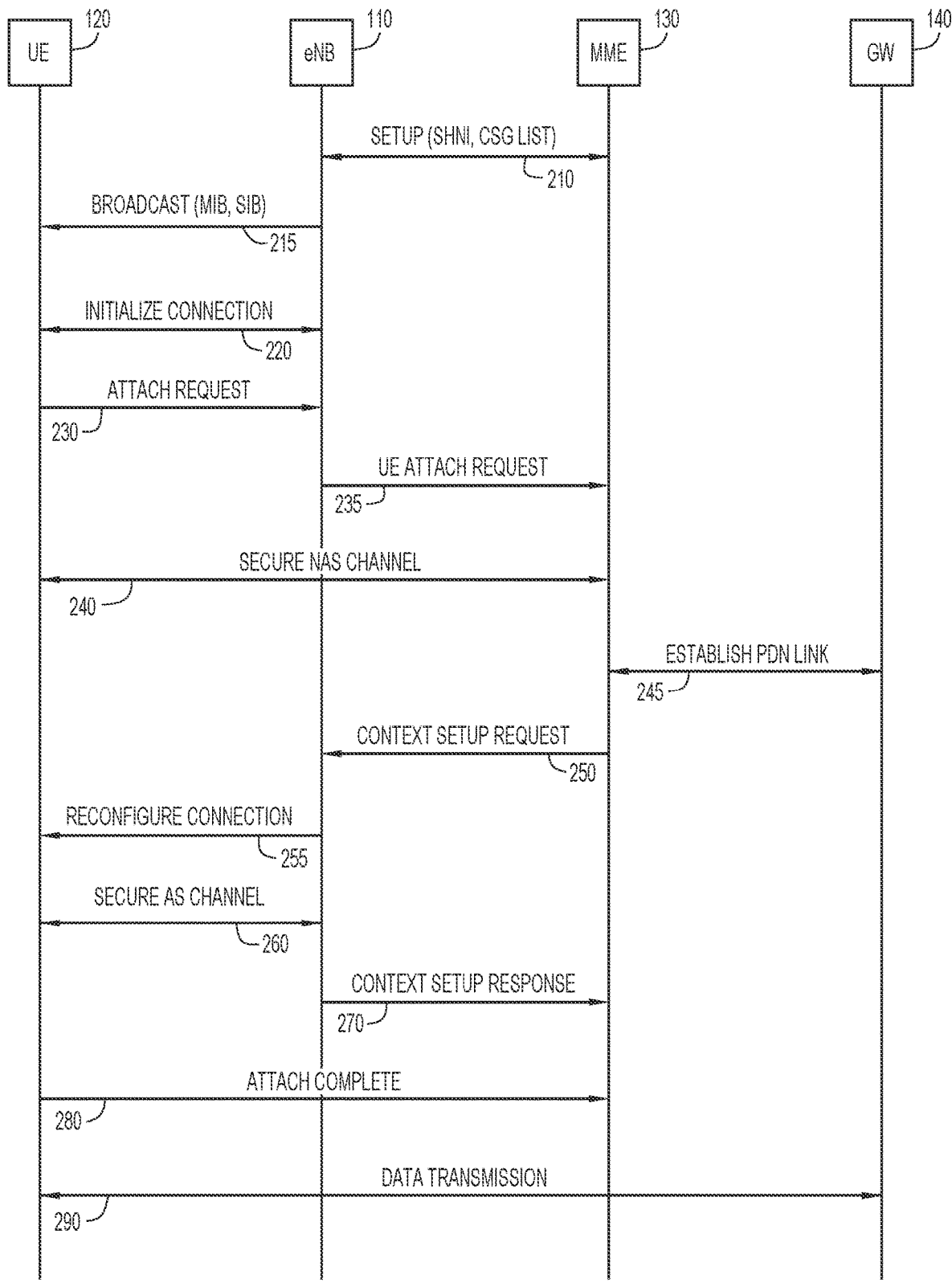
FIG. 2 is a message flow diagram illustrating a user equipment obtaining internet access, according to an example embodiment.

Referring now to FIG. 2, a message flow diagram illustrates messages passed in the communication system 100 to advertise internet accessibility to a UE 120. In some instances, a single message depicted in FIG. 2 may represent multiple physical messages between nodes of the communication system 100. Initially, the MME 130 configures the eNB 110 to provide service to local UEs, such as UE 120, with setup exchange 210. In one example, the setup exchange 210 may include a Shared Home Network Identity (SHNI) and a Closed Subscriber Group (CSG) list. Additionally, the UE 120 may be configured (not shown) with authentication credentials for internet service.

The eNB 110 broadcasts message 215 including a Master Information Block (MIB) and one or more System Information Blocks (SIBs). In one example, the broadcast message 215 includes an internet indication that signals to local UEs that the eNB can provide internet access. The broadcast message 215 may include a Broadcast Control Channel (BCCH) transmission with the internet indication in SIB1. The UE 120 receives the broadcast message 215 and detects that the eNB 110 can provide internet access. The UE 120 and the eNB 110 initialize a connection 220 to enable the UE 120 to access internet services. In one example, the initialization of the connection 220 may include a random access procedure, a Radio Resource Control (RRC) connection request from the UE 120, and a RRC connection response from the eNB 110.

Once the RRC layer between the UE 120 and the eNB 110 is initialized, the UE 120 sends an attach request 230 to the eNB 110. In one example, the attach request 230 may be included in an RRC connection complete message. Additionally, the attach request 230 may include a PDN connection request. The eNB 110 forwards the attach request 235 to the MME 130 for handling. The MME 130 detects that the UE 120 is request internet service, and may determine a Public Land Mobile Network (PLMN) identity from an IMSI included in the attach request 235.

The Non-Access Stratum (NAS) channel between the UE 120 and the MME 130 is secured in exchange 240. In one example, the UE 120 and the MME 130 may generate a shared key using a Diffie-Hellman exchange. The shared key may then be used to generate pairwise security keys between the UE 120 and the MME 130, as well as between the UE 120 and the eNB 110. The pairwise security keys may be used to secure the NAS channel (i.e., between the UE 120 and the MME 130) as well as the radio channel (i.e., between the eNB 110 and the UE 120). The MME 130 establishes a PDN connection 245 with the service provider GW 140 that will provide internet access to the UE 120. In one example, the MME determines the Access Point Name (APN) to establish the PDN link with the GW 140.

The MME 130 sends a context setup request 250 to the eNB 110 to begin the process for setting up the data connection. In one example, the context setup request 250 includes an attach-accept message, a default bearer activation request, and a shared key. The eNB 110 sends a message 255 to reconfigure the connection between the eNB 110 and the UE 120 for the data connection. In one example, the message 255 includes the attach-accept message from the MME 130. Based on the message 255 to reconfigure the air interface, the eNB 110 and the UE 120 secure the Access Stratum (AS) channel 260. Once the AS channel 260 is secured, the eNB 110 sends a context setup response 270 to the MME 130 to indicate that the eNB 110 is properly configured. The UE 120 sends an attach-complete message 280 to the MME 130 to indicate that the UE 120 is attached to the eNB 110 and the UE 120 configured to begin a data session 290 through the GW 140.

Figure 3:
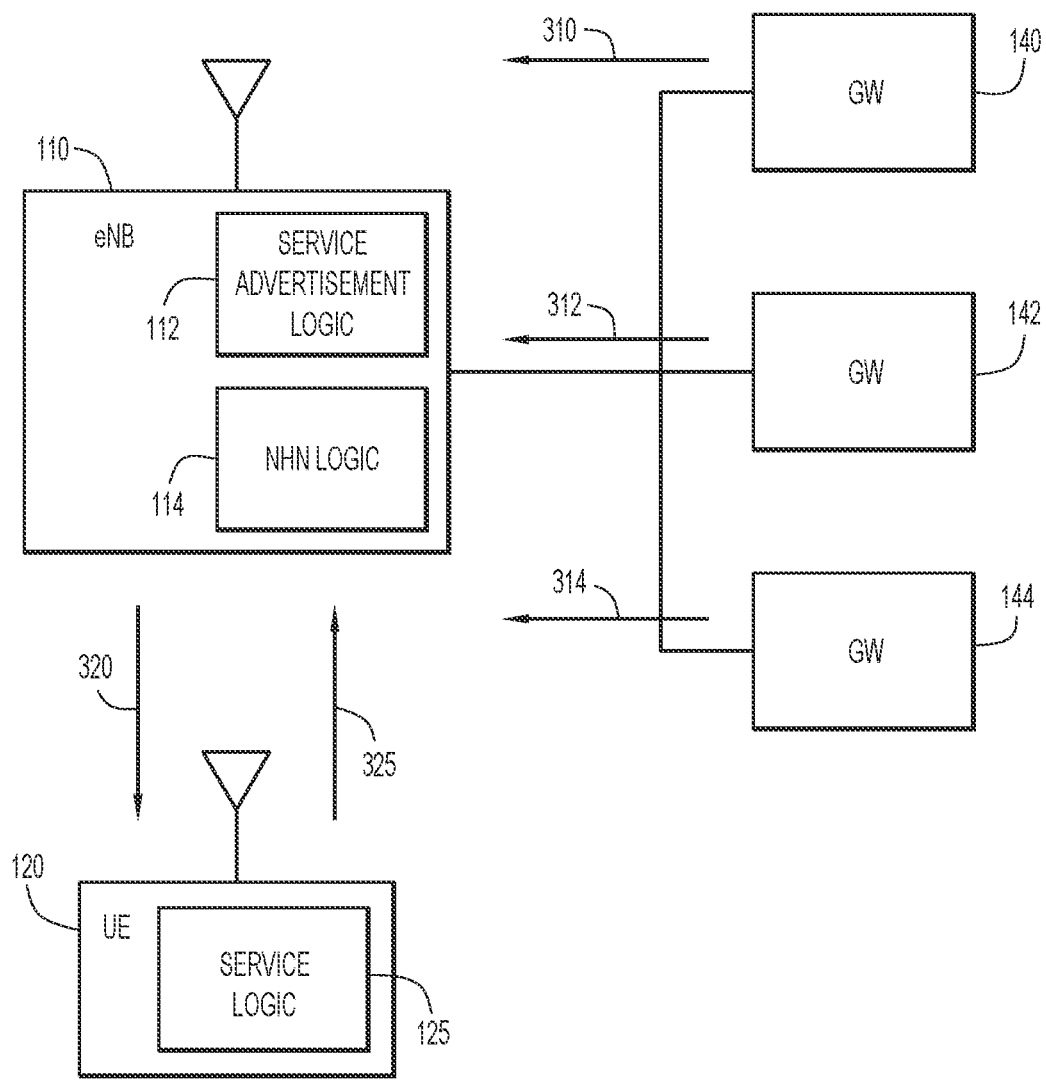
FIG. 3 illustrates a user equipment selecting a service provider from a neutral host network, according to an example embodiment.

Referring now to FIG. 3, a system diagram illustrates the UE 120 obtaining internet access in an NHN environment with a single operator of a network element (e.g., eNB 110) offering various services (e.g., internet access) from multiple service providers (e.g., GW 140, 142, and 144). Initially, the service provider gateways 140, 142, and 144 each provide information 310, 312, and 314, respectively, to the eNB 110. The information 310, 312, and 314 indicates whether the respective GW 140, 142, or 144 is able to provide internet access. The information 310, 312, and 314 may also provide indications of the capabilities (e.g., bandwidth, QoS, congestion, etc.) of each respective GW 140, 142, or 144. The NHN logic 114 of the eNB 110 enables the eNB 110 to include a list of service providers that provide internet access in the broadcast 320 to the UE 120. In one example, the broadcast 320 includes the MIB, and various SIBs, and the list of service providers is provided in a predetermined SIB, such as SIB17.

The UE 120 receives the broadcast 320 and selects a service provider form among the list of service providers to provide internet access to the UE 120. The UE 120 responds with an attach request 325 that specifies the service provider selected by the UE 120. The eNB 110 sets up the data connection with the selected service provider gateway, and the UE 120 is able to access the internet through the selected service provider gateway.

In one example, the RAN (e.g., eNB 110) is owned and operated by a CBRS operator, and multiple providers provide various services (e.g., internet access) through the RAN. The UE 120 may be configured with a service profile that indicates internet service is enabled. Optionally, the service profile may indicate a preferred service provider that offers internet service. The eNB 110 broadcasts an internet indication enabled in the SIB1 block. If any of the service providers offer internet service, the provider would notify the eNB 110, and the eNB 110 would enable the internet indication in the SIB1 block. Additionally, the eNB 110 would also broadcast (e.g., in the SIB17 block) which service providers are offering internet service.

While latching on to the network, the UE 120 checks the SIB1 block to determine if the internet indication is being broadcast. If the internet indication is being broadcast, the UE 120 may select a service provider based on a list of preferred service providers configured in the service profile of the mobile device and based on the service providers listed in the SIB17 block. Optionally, if the UE 120 is not configured with a preferred service provider list, the UE 120 may be presented with a list of service providers from which the UE 120 may select.

The UE 120 with attach to the network and configure the attach-type to be internet enabled and the PDN-request-type to be internet enabled. The UE 120 may use a Diffie-Hellman exchange with the network to protect the integrity and privacy of the security keys. On receiving the attach request with the attach-type and PDN-request-type indicating internet enabled, the MME 130 (not shown in FIG. 3) will find the default APN locally configured. The MME 130 allows the UE 120 to attach to the network and facilitate PDN connectivity.

Figure 4:
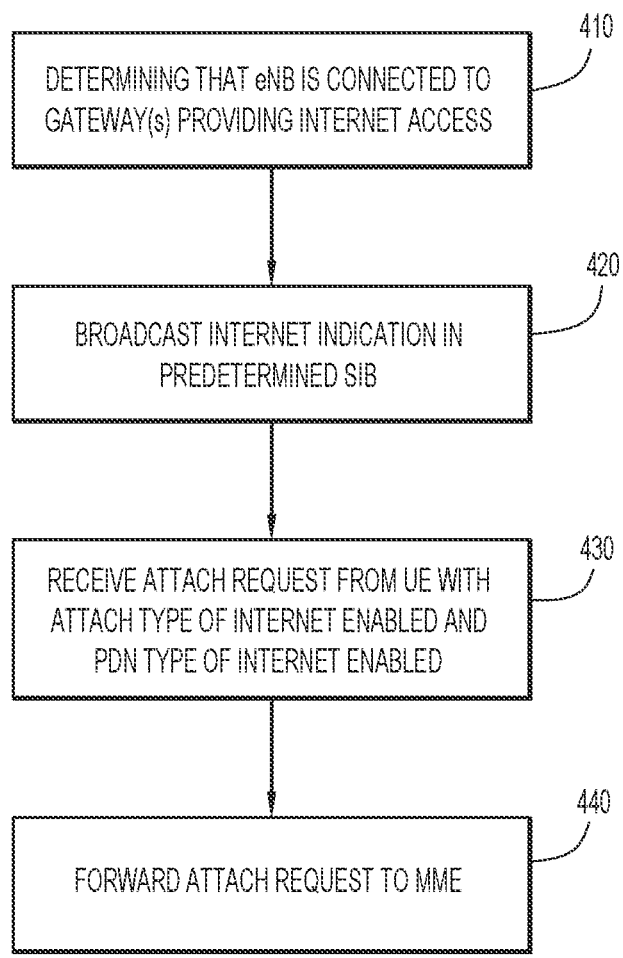
FIG. 4 is a flowchart illustrating operations of an Evolved Node B (eNB) in providing a user equipment information on internet accessibility, according to an example embodiment.

Referring nowt to FIG. 4, a flowchart illustrating operations performed at an eNB (e.g., eNB 110) in a process 400 for enabling local UEs to obtain internet access efficiently. At 410, the eNB determines that the eNB is connected to at least one gateway that provides public internet access. In one example, the eNB may be connected to multiple service providers providing public internet access in a NHN environment. At 420, the eNB broadcasts an internet indication in a predetermined SIB. In one example, the internet indication is broadcast as part of SIB1. In another example, the eNB may broadcast a list of the service provider gateways that provide public internet access in another predetermined SIB, such as SIB17.

At 430, the eNB receives an attach request from a UE. The attach request includes an attach type of internet enabled and a PDN type of internet enabled to indicate that the UE should be connected to a service provider gateway that provides internet access. In one example, the attach request may also include an indication of a specific service provider gateway to connect to the UE for internet access. At 440, the eNB forwards the attach request to a MME, which configures the eNB and UE to connect to a service provider gateway that provides public internet access. In one example, the eNB may forward a selection of a particular service provider gateway to the MME, enabling the MME to configure the connection between the UE and the selected gateway.

Figure 5:
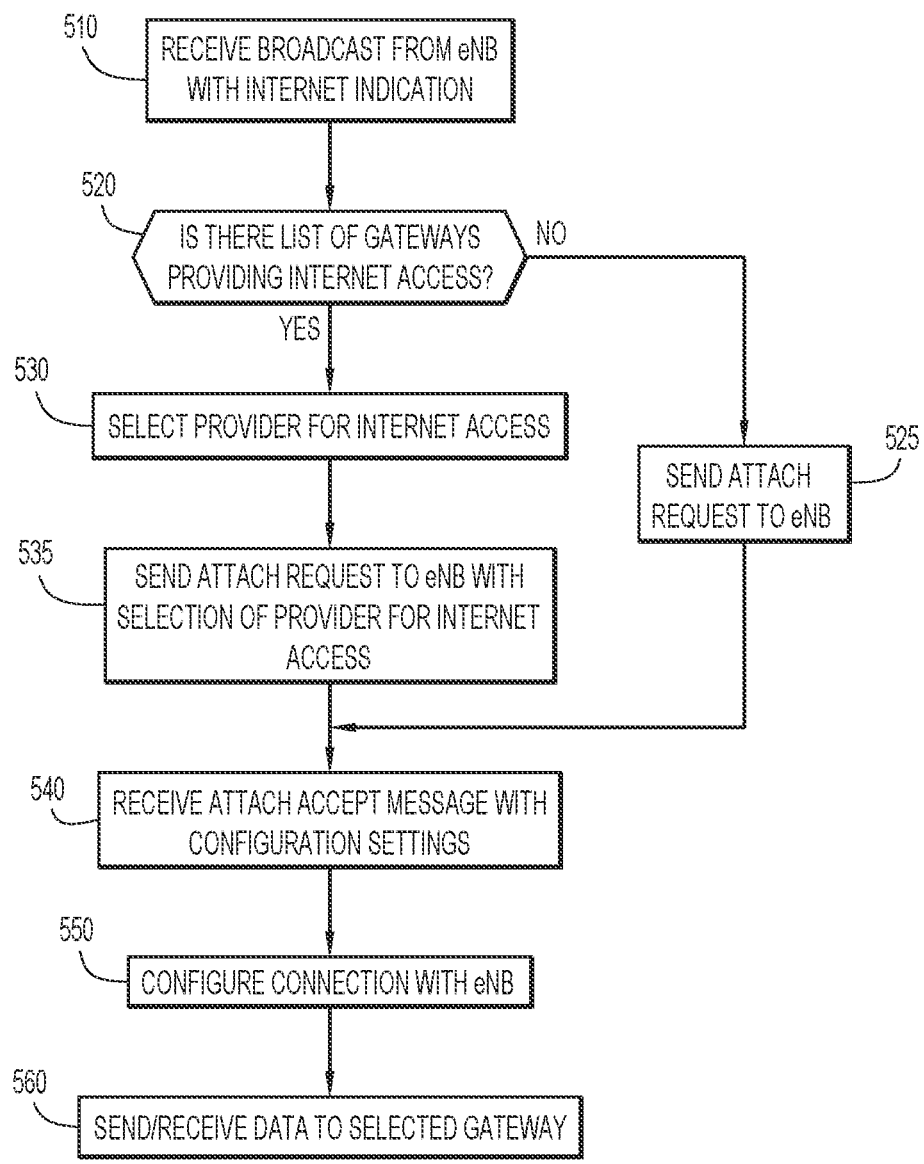
FIG. 5 is a flowchart illustrating operations of a user equipment obtaining information about internet access and attaching to a selected provider, according to an example embodiment.

Referring now to FIG. 5, a flowchart illustrates operations performed at a UE (e.g., UE 120) in a process 500 to obtain internet access through an eNB. At 510, the UE receives a broadcast including an internet indication from an eNB. In one example, the internet indication is included in a predetermined SIB, such as SIB1. At 520, the UE determines if there is a list of service provider gateways that provide public internet access. In one example, the list of service provider gateways may be included in another predetermined SIB, such as SIB17. If there is no list of service provider gateways included in the broadcast, then the UE sends an attach request to the eNB at 525.

If the UE did receive a list of service provider gateways in the broadcast form the eNB, then the UE selects one of the service providers to provide internet access at 530. In one example, the UE may be preconfigured with a preferred list of service providers that is compared to the list of service providers broadcast from the eNB to select a service provider to provide internet access. At 535, the UE sends an attach request to the eNB indicating the service provider gateway that is selected to provide internet access.

In response to either the attach request sent at 525 or 535, the UE receives an attach accept message at 540. The attach accept message includes configuration settings for the connection to a service provider gateway through the eNB. At 550, the UE configures the connection with the eNB and the service provider gateway. In one example, the UE and eNB secure the air interface with a shared key. At 560, the UE begins to send and receive data to the service provider gateway that provides internet access to the UE.

Figure 6:
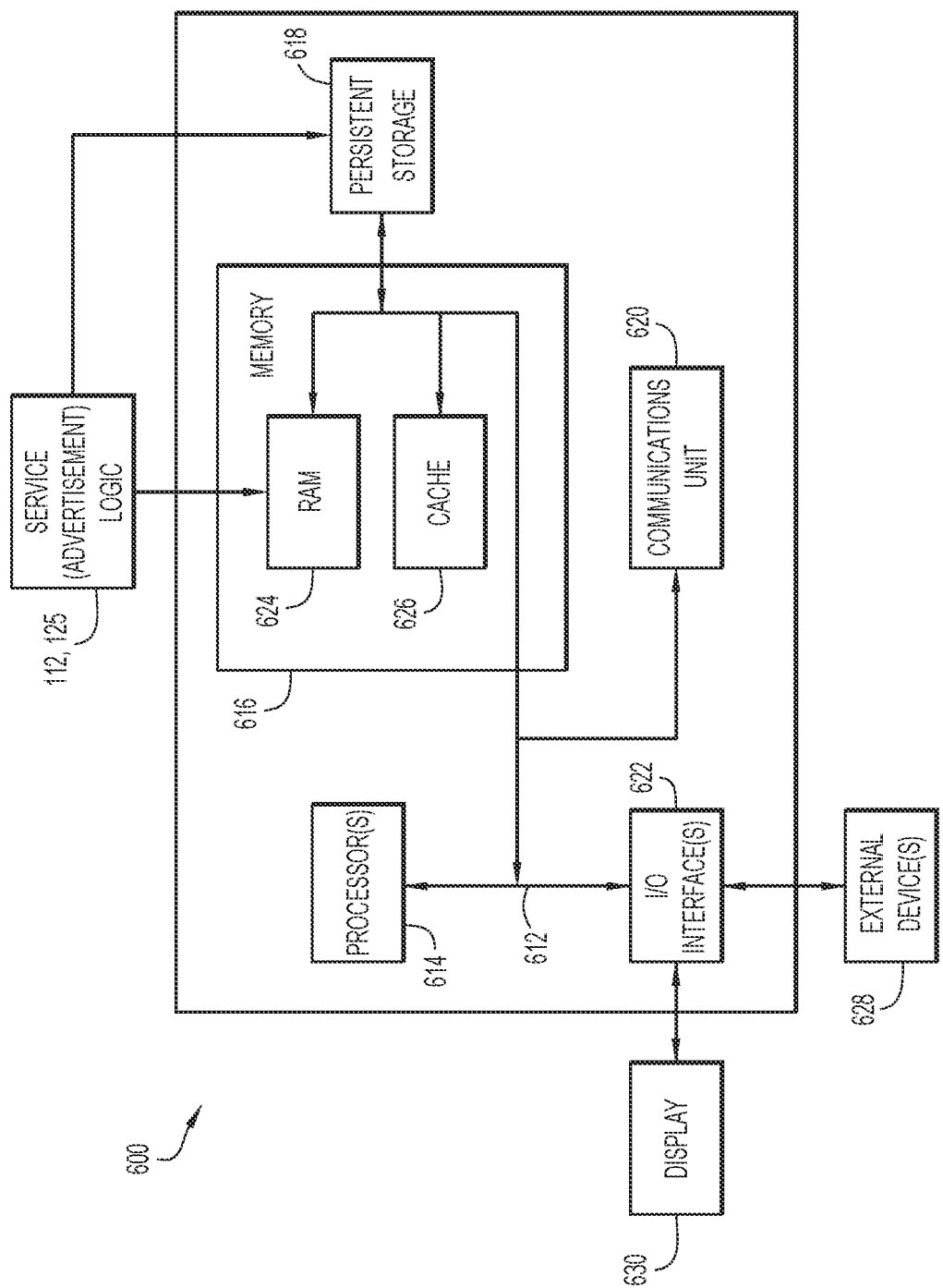
FIG. 6 illustrates a simplified block diagram of a device that may be configured to perform methods presented herein, according to an example embodiment.

Referring now to FIG. 6, a hardware block diagram illustrates a computing device 600 that may perform the functions of any of the servers or computing or control entities referred to herein in connection with the wireless communication system described herein. It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media. Instructions for the service logic 125 or the service advertisement logic 112 may be stored in memory 616 or persistent storage 618 for execution by processor(s) 614.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface units, such as network interface cards. Communications unit 620 may provide communications through the use of either or both physical and wireless communications links.

I/O interface(s) 622 allows for input and output of data with other devices that may be connected to computer device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer usable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to user identities or credentials). The database system may be included within or coupled to the server and/or client systems. The database systems and/or storage structures may be remote from or local to the computer or other processing systems, and may store any desired data (e.g., data relating to user authentication/authorization or credentials).

The present embodiments may employ any number of any type of user interface (e.g., Graphical User Interface (GUI), command-line, prompt, etc.) for obtaining or providing information (e.g., data relating to user authentication/authorization or credentials), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In summary, the techniques presented herein define semantics in the attach procedures for presenting internet support indicators to mobile devices. The mobile devices do not have to expend time and resources to attach to each network to determine if internet service is available, and can quickly attach to a network that is able to provide internet service.

In one form, a method is provided to enable an eNB to provide an internet indication to a UE. The method includes determining that the eNB is connected to at least one gateway that provides public internet access, and broadcasting an internet indication in a predetermined SIB. The method also includes receiving an attach request from a UE. The attach request includes an attach type of internet enabled and a PDN type of internet enabled. The method further includes forwarding the attach request to an MME.

In another form, an apparatus comprising a network interface, a wireless interface, and a processor is provided. The network interface is configured to communicate with a plurality of computing devices across one or more computer networks. The wireless interface is configured to wirelessly communicate with at least one UE. The processor is configured to determine than an eNB is connected to at least one gateway that provides public internet access, and cause the wireless interface to broadcast an internet indication in a predetermined SIB. The processor is also configured to receive via the wireless interface an attach request from the at least one UE. The attach request includes an attach type of internet enabled and a PDN type of internet enabled. The processor is further configured to cause the network interface to forward the attach request to an MME.

In yet another form a non-transitory computer readable storage media is provided that is encoded with instructions that, when executed by a processor of an eNB, cause the processor to determine that the eNB is connected to at least one gateway that provides public internet access, and broadcast an internet indication from the eNB in a predetermined SIB. The instructions also cause the processor receive an attach request from a UE. The attach request includes an attach type of internet enabled and a PDN type of internet enabled. The instructions further cause the processor to forward the attach request to an MME.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language, Python or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
connecting a Radio Access Network (RAN) element to one or more gateways, wherein each gateway is associated with a corresponding service provider;
determining that at least one gateway of the one or more gateways is associated with a corresponding service provider that provides public internet access;
broadcasting an internet indication from the RAN element, the internet indication indicating that the RAN element is connected to the at least one gateway that provides public internet access;
determining that a User Equipment (UE) has requested public internet access via the RAN element; and
providing the UE with public internet access via the RAN element.

2. The method of claim 1, wherein the internet indication is broadcast in a predetermined information block.

3. The method of claim 2, wherein the predetermined information block is a Master Information Block (MIB) or a System Information Block (SIB).

4. The method of claim 2, wherein the predetermined information block is System Information Block 1 (SIB1).

5. The method of claim 2, further comprising broadcasting a list of gateways providing public internet access in another predetermined information block.

6. The method of claim 5, wherein the another predetermined information block is System Information Block 17 (SIB17).

7. The method of claim 5, further comprising obtaining a selection by the UE from among the list of gateways providing public internet access.

8. An apparatus comprising:
a network interface configured to communicate with a plurality of computing devices across one or more computer networks;
a wireless interface configured to wirelessly communicate with at least one User Equipment (UE); and
a processor coupled to the network interface and the wireless interface, the processor configured to:
connect the apparatus to one or more gateways, wherein each gateway is associated with a corresponding service provider;
determine that at least one gateway of the one or more gateways is associated with a corresponding service provider that provides public internet access;
broadcasting an internet indication from the wireless interface, the internet indication indicating that the apparatus is connected to the at least one gateway that provides public internet access;
determining that the at least one UE has requested public internet access via the apparatus; and
providing the at least one UE with public internet access via the apparatus.

9. The apparatus of claim 8, wherein the wireless interface in configured to broadcast the internet indication in a predetermined information block.

10. The apparatus of claim 9, wherein the predetermined information block is a Master Information Block (MIB) or a System Information Block (SIB).

11. The apparatus of claim 9, wherein the predetermined information block is System Information Block 1 (SIB1).

12. The apparatus of claim 9, wherein the wireless interface is further configured to broadcast a list of gateways providing public internet access in another predetermined information block.

13. The apparatus of claim 12, wherein the another predetermined information block is System Information Block 17 (SIB17).

14. The apparatus of claim 12, wherein the processor is further configured to obtain a selection by the UE from among the list of gateways providing public internet access.

15. One or more non-transitory computer readable storage media encoded with instructions that, when executed by a processor of Radio Access Network (RAN) element, cause the processor to:
connect the RAN element to one or more gateways, wherein each gateway is associated with a corresponding service provider;
determine that at least one gateway of the one or more gateways is associated with a corresponding service provider that provides public internet access;
broadcast an internet indication from the RAN element, the internet indication indicating that the RAN element is connected to the at least one gateway that provides public internet access;
determine that a User Equipment (UE) has requested public internet access via the RAN element; and
provide the UE with public internet access via the RAN element.

16. The non-transitory computer readable storage media of claim 15, further comprising instructions operable to cause the processor to broadcast the internet indication in a predetermined information block.

17. The non-transitory computer readable storage media of claim 16, wherein the predetermined information block is a Master Information Block (MIB) or a System Information Block (SIB).

18. The non-transitory computer readable storage media of claim 16, wherein the predetermined information block is System Information Block 1 (SIB1).

19. The non-transitory computer readable storage media of claim 16, further comprising instructions operable to cause the processor to broadcast a list of gateways providing public internet access in another predetermined information block.

20. The non-transitory computer readable storage media of claim 19, further comprising instructions operable to cause the processor to obtain a selection by the UE from among the list of gateways providing public internet access.

* * * * *